(No Model.)
L. D. WHITTEMORE, Jr.
TIRE FOR BICYCLES.
No. 447,993. Patented Mar. 10, 1891.
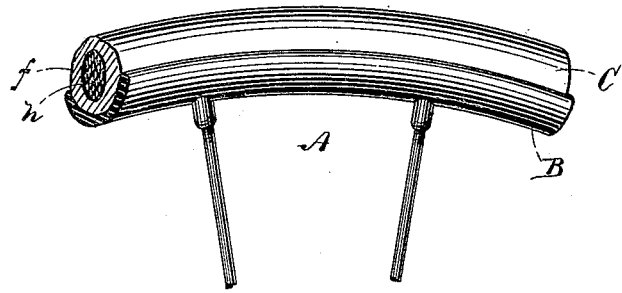
Fig. 1.
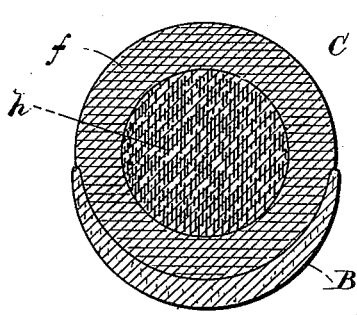 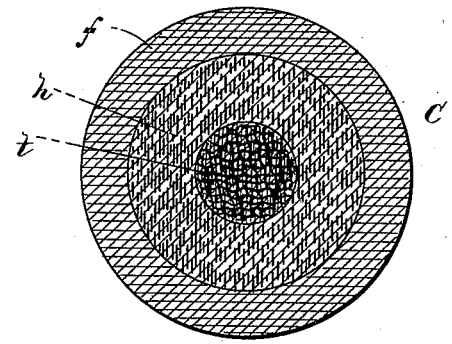
Fig. 2. Fig. 3.
WITNESSES:
INVENTOR:
Louis D. Whittemore Jr.
PER C. A. Shaw
ATTYS.

UNITED STATES PATENT OFFICE.

LOUIS D. WHITTEMORE, JR., OF BOSTON, MASSACHUSETTS.

TIRE FOR BICYCLES.

SPECIFICATION forming part of Letters Patent No. 447,993, dated March 10, 1891.

Application filed December 15, 1890. Serial No. 374,825. (No model.)

*To all whom it may concern:*

Be it known that I, LOUIS D. WHITTEMORE, Jr., of Boston, in the county of Suffolk, State of Massachusetts, have invented certain new and useful Improvements in Tires for Bicycles, of which the following is a description sufficiently full, clear, and exact to enable any person skilled in the art or science to which said invention appertains to make and use the same, reference being had to the accompanying drawings, forming part of this specification, in which—

Figure 1 a perspective view showing a section of my improved tire in position on the felly; Fig. 2, a vertical transverse section of the same enlarged, and Fig. 3 a like view illustrating a modification.

Like letters of reference indicate corresponding parts in the different figures of the drawings.

My invention relates especially to elastic tires for velocipedes and similar vehicles; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the wheel, which is provided with a peripherally-grooved felly B in the usual manner.

The tire C consists of a ring of rubber tubing $f$, said ring being slightly less in diameter than the wheel, so that when adjusted it will hug or bind in the felly-groove. The tube $f$ is filled with a soft rubber composition $h$, which adheres thereto, and is much more readily compressed than the material of the tube. In forming this composition filling I employ the following ingredients compounded substantially in the proportions stated: gum-rubber, one part; glue, two parts; molasses, one part; glycerine, one part. I do not, however, confine myself to employing this specific compound as any composition which may be readily molded into the tube and has sufficient elasticity may be used.

Tires of this class when constructed of solid rubber or with a wire or other solid material passing through the center rapidly wear and become useless. The resistance to compression is so great that the face of the tire soon becomes ragged and cut from contact with stones and other obstructions. This stiffness or rigidity of the tire, moreover, causes the shock of such contact to be conveyed to the rider. My improved tire obviates these objections. The soft elastic center of the tire permits it to flatten readily from the weight of the rider or when meeting obstructions, while the composition of the tubing is sufficiently hard and elastic to render it less liable to be cut than ordinary tires.

When tires of greater diameter than usual are employed for specific purposes, a tube $f$ of larger diameter is employed, the walls thereof remaining practically of the same thickness, as shown in Fig. 3. To fill the interior of such a tube with the soft elastic material $h$ would greatly increase the weight and render the tire too flexible and cause it to flatten on the ground when in use, thereby retarding the speed of the machine and necessitating the expenditure of greater power to drive it. To overcome this objection, I mold the composition $h$ around a core $t$ of hemp or any suitable fibrous material which imparts sufficient rigidity to prevent the tire from spreading.

Instead of employing rubber tubing filled with a soft composition, as described, the tire may be formed of solid rubber, the outer surface being hardened by any suitable process, while the core remains of its original consistency and substantially the same result obtained.

Having thus explained my invention, what I claim is—

1. A tire for bicycles, comprising a rubber tube filled with an elastic material compounded of gum-rubber, glue, molasses, and glycerine, substantially in the proportions specified.

2. In a tire for bicycles, an elastic tube, in combination with a core of fibrous or other flexible material disposed therein, and a soft elastic filling surrounding said core, substantially as described.

3. In a tire for bicycles, the tubing $f$, fibrous or flexible core $t$, and soft elastic filling $h$, combined and arranged substantially as described.

LOUIS D. WHITTEMORE, Jr.

Witnesses:
O. W. SHAW,
K. DURFEE.